United States Patent
Dong et al.

(10) Patent No.: US 11,218,001 B2
(45) Date of Patent: Jan. 4, 2022

(54) POWER SUPPLY SYSTEM AND METHOD FOR ALTERNATING CURRENT LOAD

(71) Applicant: Delta Electronics (Shanghai) CO., LTD, Shanghai (CN)

(72) Inventors: Mingxuan Dong, Shanghai (CN); Changyong Wang, Shanghai (CN); Aibin Qiu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 17/134,238

(22) Filed: Dec. 25, 2020

(65) Prior Publication Data

US 2021/0218249 A1 Jul. 15, 2021

(30) Foreign Application Priority Data

Jan. 10, 2020 (CN) .......................... 202010025244.0

(51) Int. Cl.
*H02J 3/38* (2006.01)
*H02J 7/00* (2006.01)
*H02P 27/06* (2006.01)

(52) U.S. Cl.
CPC ............ *H02J 3/381* (2013.01); *H02J 7/0048* (2020.01); *H02J 7/0068* (2013.01); *H02J 2207/20* (2020.01); *H02J 2300/10* (2020.01); *H02J 2300/24* (2020.01); *H02J 2300/28* (2020.01); *H02P 27/06* (2013.01)

(58) Field of Classification Search
CPC .. H02J 3/381; H02J 3/38; H02J 7/0048; H02J 7/0068; H02J 7/00; H02J 2300/28; H02J 2207/20; H02J 2300/10; H02J 2300/24; H02P 27/06
See application file for complete search history.

(56) References Cited

U.S. PATENT DOCUMENTS

2015/0194820 A1 7/2015 Liang et al.

FOREIGN PATENT DOCUMENTS

| CN | 203368044 U | 12/2013 |
| CN | 105305480 A | 2/2016 |
| CN | 105429128 A | 3/2016 |
| CN | 104659804 B | 3/2017 |
| CN | 108123431 A | 6/2018 |

(Continued)

OTHER PUBLICATIONS

The Extended European Search Report dated May 10, 2021 for EP patent application No. 21150738.9.

(Continued)

*Primary Examiner* — Robert L Deberadinis
(74) *Attorney, Agent, or Firm* — Qinghong Xu

(57) ABSTRACT

The present disclosure provides a power supply system method for an AC load. The system includes a power supply device and a DC/AC converter. An AC side of the DC/AC converter is coupled to an AC grid and the AC load through an AC bus. The power supply device outputs DC electric energy and is coupled to a DC side of the DC/AC converter through a DC bus. The power supply device includes an energy storage circuit and a controller. The energy storage circuit includes a first energy storage circuitry and a second energy storage circuitry. The controller is configured to control a conversion operation of the first energy storage circuitry to output a low-frequency power to the DC bus, and a conversion operation of the second energy storage circuitry to output a high-frequency power to the DC bus.

20 Claims, 12 Drawing Sheets

(56) References Cited

FOREIGN PATENT DOCUMENTS

| | | |
|---|---|---|
| CN | 207910471 U | 9/2018 |
| CN | 108808652 A | 11/2018 |
| GN | 102377192 A | 3/2012 |
| GN | 106877368 A | 6/2017 |
| JP | S5749332 A | 3/1982 |
| KR | 20180090673 A | 8/2018 |
| TW | 201117513 A | 5/2011 |
| TW | 201914145 A | 4/2019 |
| WO | 2018231673 A1 | 12/2018 |

OTHER PUBLICATIONS

The 1st Office Action dated Aug. 30, 2021 for TW patent application No. 109141889.

POWER SUPPLY SYSTEM AND METHOD FOR ALTERNATING CURRENT LOAD

CROSS REFERENCE

This application claims priority to Chinese patent application No. 202010025244.0 filed on Jan. 10, 2020, the entire contents of which are incorporated herein by reference.

TECHNICAL FIELD

The present disclosure relates to the field of power supply and distribution, and in particular, to a power supply system and method for alternating current (AC) load.

BACKGROUND

In order to alleviate pressure of power supply, a DC microgrid system including photovoltaic, wind power generation, energy storage devices, etc. has gradually received more attention. Randomness of load fluctuations and intermittent and distributed characteristics of renewable energy sources such as photovoltaic and wind power have brought great challenges to the stability of DC microgrids. Energy storage devices play an important role in ensuring power balance, electric energy quality, and stable operation of the system.

SUMMARY

The embodiments of the present disclosure provide a power supply system and method for an AC load.

Other features and advantages of the disclosure will become apparent from the following detailed description, or may be learned in part through the practice of the disclosure.

According to a first aspect of the embodiments of the present disclosure, a power supply system for an AC load is provided. The system includes: a DC/AC converter an AC side of that is coupled to an AC grid and the AC load through an AC bus; and a power supply device coupled to a DC side of the DC/AC converter through a DC bus and configured to output DC electric energy to the DC bus; and the power supply device includes an energy storage circuit including a first energy storage circuitry and a second energy storage circuitry, and a controller configured to control a conversion operation of the first energy storage circuitry to output a low-frequency power, and a conversion operation of the second energy storage circuitry to output a high-frequency power.

In an exemplary embodiment of the present disclosure, the controller is configured to control the first energy storage circuitry to operate in a current source mode to output the low-frequency power, and the second energy storage circuitry to operate in a voltage source mode to output the high-frequency power.

In an exemplary embodiment of the present disclosure, the first energy storage circuitry includes a low-power-density energy storage element and a first DC/DC converter, and the controller is configured to control an output current of the first DC/DC converter.

In an exemplary embodiment of the present disclosure, the second energy storage circuitry includes a high-power-density energy storage element and a second DC/DC converter, and the controller is configured to control an output voltage of the second DC/DC converter.

In an exemplary embodiment of the present disclosure, the first energy storage circuitry or the second energy storage circuitry includes a flywheel energy storage device and an AC/DC converter, and the controller is configured to control an output current or an output voltage of the AC/DC converter.

In an exemplary embodiment of the present disclosure, the energy storage circuit has an output port coupled to the DC bus, an output terminal of the first energy storage circuitry and an output terminal of the second energy storage circuitry are coupled in parallel to the output port, and total output electric energy of the energy storage circuit is transmitted to the DC bus through the output port.

In an exemplary embodiment of the present disclosure, the power supply device is a DC microgrid system, including one or more of a photovoltaic power generator, a wind power generator, and a diesel generator.

In an exemplary embodiment of the present disclosure, the controller includes: a calculation circuit, configured to calculate an output power of the energy storage circuit according to a voltage signal of the DC bus and a current signal of the energy storage circuit; a power extraction circuit, coupled to the calculation circuit and configured to extract a low-frequency component in the output power; a current source control circuit, coupled to the power extraction circuit and configured to adjust an output power of the first energy storage circuitry according to the low-frequency component; a voltage source control circuit, configured to adjust an output voltage of the second energy storage circuitry according to a voltage reference value of the DC bus, causing the second energy storage circuitry to output the high-frequency power.

In an exemplary embodiment of the present disclosure, the first energy storage circuitry includes a low-power-density battery, the second energy storage circuitry includes a high-power-density battery, and the calculation circuit is further configured to calculate a first state of charge which is a state of charge of the high-power-density battery and a second state of charge which is a state of charge of the low-power-density battery.

In an exemplary embodiment of the present disclosure, the power extraction circuit includes: a first calculation circuitry, configured to calculate an average power change rate within a period of time according to the output power; and a filtering circuitry, configured to filter the output power to obtain the low-frequency component in the output power when the average power change rate is greater than a power fluctuation threshold.

In an exemplary embodiment of the present disclosure, the power extraction circuit further includes: a second calculation circuitry, configured to calculate and obtain a first charge-discharge balance degree and a second charge-discharge balance degree respectively according to the first state of charge and the second state of charge; a first adjustment circuitry, configured to determine a window function according to the second charge-discharge balance degree, the output power, and the average power change rate, and send the window function to the filtering circuitry to adjust window width and window shape of the filtering circuitry according to the window function; a second adjustment circuitry, configured to adjust a cutoff frequency of the filtering circuitry according to the first charge-discharge balance degree, calculate a response function of the cutoff frequency in a time domain, and send the response function to the filtering circuitry.

In an exemplary embodiment of the present disclosure, the filtering circuitry is further configured to calculate a filtering function, according to the window function, the response function, and the output power, and extract the low-frequency component according to the filtering function.

In an exemplary embodiment of the present disclosure, when the average power change rate is less than or equal to the power fluctuation threshold, the output power is the low-frequency component and output to the current source control circuit.

In an exemplary embodiment of the present disclosure, the AC load is an AC asynchronous motor, the second energy storage circuitry is configured to provide power for starting the AC asynchronous motor, and the first energy storage circuitry is configured to provide power for stable operation of the AC asynchronous motor.

In an exemplary embodiment of the present disclosure, the AC load is an electric vehicle charging station.

According to a second aspect of the embodiments of the present disclosure, a power supply method is provided, which is applied to a power supply system for an AC load. The power supply system for AC load includes a DC/AC converter an AC side of that is coupled to an AC grid and the AC load through an AC bus, and a power supply device coupled to a DC side of the DC/AC converter through a DC bus and configured to output DC electric energy to the DC bus; the power supply device including a controller, and an energy storage circuit including a first energy storage circuitry and a second energy storage circuitry. The power supply method includes: calculating an output power of the energy storage circuit according to a voltage signal of the DC bus and a current signal of the energy storage circuit; extracting a low-frequency component in the output power; adjusting an output power of the first energy storage circuitry according to the low-frequency component; and adjusting an output voltage of the second energy storage circuitry, causing the second energy storage circuitry to output a high-frequency power.

In an exemplary embodiment of the present disclosure, the first energy storage circuitry includes a low-power-density battery, the second energy storage circuitry includes a high-power-density battery, and the method further includes: calculating a first state of charge which is a state of charge of the high-power-density battery and a second state of charge which is a state of charge of the low-power-density battery.

In an exemplary embodiment of the present disclosure, the extracting the low-frequency component in the output power includes: calculating an average power change rate within a period of time according to the output power; filtering the output power to obtain the low-frequency component in the output power when the average power change rate is greater than a power fluctuation threshold; and outputting the low-frequency component to a current source control circuit.

In an exemplary embodiment of the present disclosure, when the average power change rate is less than or equal to the power fluctuation threshold, outputting the output power that is the low-frequency component to the current source control circuit.

In an exemplary embodiment of the present disclosure, the extracting the low-frequency component in the output power further includes: calculating a first charge-discharge balance degree and a second charge-discharge balance degree respectively according to the first state of charge and the second state of charge; determining a window function according to the second charge-discharge balance degree, the output power, and the power change rate; adjusting window width and window shape of the filtering circuitry according to the window function; adjusting a preset cutoff frequency to obtain a final cutoff frequency according to the first charge-discharge balance degree; calculating a response function of the final cutoff frequency in a time domain; and calculating a filter function according to the window function, the response function, and the output power.

It should be understood that the above general description and the following detailed description are merely exemplary, and should not limit the present disclosure.

BRIEF DESCRIPTION OF THE DRAWINGS

The drawings herein are incorporated in and constitute a part of this specification, illustrate embodiments consistent with the present disclosure, and together with the description serve to explain the principles of the present disclosure. The drawings described below are just illustrated some embodiments of the present disclosure. For those of ordinary skill in the art, other drawings may be obtained based on these drawings without creative efforts.

DETAILED DESCRIPTION

Figure 1:
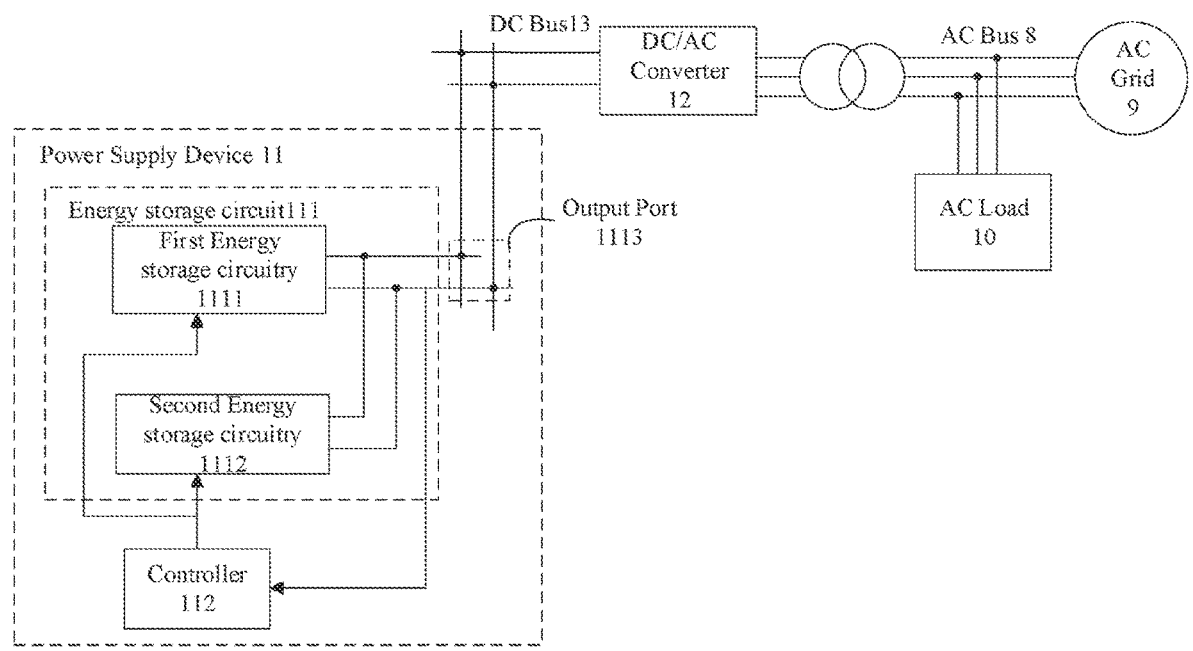
FIG. 1 shows a schematic diagram of a power supply system for an AC load according to an exemplary embodiment of the present disclosure.

Example embodiments will now be described more fully with reference to the accompanying drawings. However, the exemplary embodiments can be implemented in various forms, and should not be construed as being limited to the embodiments set forth herein. On the contrary, these embodiments are provided so that the present invention will be comprehensive and complete, and concepts of the exemplary embodiments are fully conveyed to those skilled in the art. In the drawings, same reference numerals denote same or similar parts, and thus repeated description will be omitted.

The described features, structures, or characteristics may be combined in any suitable manner in one or more embodiments. In the following description, numerous specific details are provided to give a thorough understanding of the embodiments of the present disclosure. However, those skilled in the art will realize that the technical solutions of the present disclosure may be practiced with omitting one or more of the specific details, or other systems, components, methods, steps, etc. may be adopted. In other instances, well-known systems, methods, implementations, or operations have not been shown or described in detail to avoid obscuring aspects of the present disclosure.

The drawings are merely schematic illustrations of the present disclosure, and the same reference numerals in the drawings represent the same or similar parts, and thus repeated descriptions thereof will be omitted. Some block diagrams shown in the drawings do not necessarily correspond to physically or logically separate entities. These functional entities may be implemented in the form of software, or implemented in one or more hardware modules or integrated circuits, or implemented in different network and/or processor methods and/or microcontroller methods.

The flowcharts shown in the drawings are only exemplary descriptions, and necessarily include all relating content and steps, and the steps are not necessarily performed in the order described. For example, some steps can also be decomposed, and some steps can be merged or partially merged, so the actual execution order may change according to the actual situation.

For high-power AC loads, such as electric vehicle charging stations and AC asynchronous motors, the electric energy required may include long-term steady-state power and instantaneous dynamic power. A single energy storage device can simultaneously handle high-frequency sudden load demand and low-frequency long-term load demand, which may sacrifice battery performance and increase battery cost.

When a grid capacity is limited or the grid is faulty, high-power AC loads require seamless power supply switching. However, at present, an external uninterruptible power system (UPS) method is commonly used, and thus seamless switching cannot be achieved, resulting in power supply for the loads being cut off.

FIG. 1 shows a schematic diagram of a power supply system for an AC load according to an exemplary embodiment of the present disclosure. As shown in FIG. 1, the power supply system 1 for the AC load includes a power supply device 11 and a DC/AC converter 12. AC side of the DC/AC converter 12 is coupled to an AC grid 9 and the AC load 10 through an AC bus 8. The power supply device 11 is coupled to DC side of the DC/AC converter 12 through a DC bus 13 and outputs DC electric energy to the DC bus 13. The power supply device 11 includes an energy storage circuit 111 and a controller 112. The energy storage circuit 111 includes at least a first energy storage circuitry 1111 and a second energy storage circuitry 1112. The controller 112 is configured to control conversion operation of the first energy storage circuitry 1111 to output a low-frequency power to the DC bus 13. The controller 112 is further configured to control conversion operation of the second energy storage circuitry 1112 to output a high-frequency power to the DC bus 13.

The power required for the AC load 10 includes the high-frequency power and the low-frequency power. The controller 112 can decompose a power signal for the AC load to extract a low-frequency component, control the first energy storage circuitry 1111 to provide the low-frequency power according to the low-frequency component, and control an output voltage of the second energy storage circuitry 1112, thereby the second energy storage circuitry 1112 automatically providing the required high-frequency power.

The power supply system for the AC load of the present disclosure is connected to both of the AC grid and the AC load through the AC bus, so it is possible to achieve seamless transition by the power supply system 1 such that the AC load can be continuously supplied when the AC grid fails and jumps or receives a dispatching command to switch to island operation. When the AC grid capacity is insufficient and thus the power supply demand for the AC load cannot be met, the power supply system 1 may provide energy to the AC grid; or when the power grid cannot meet the power demand for the AC load due to the switching capacity of the AC grid, the power supply system 1 may cooperate with the AC grid to supply power to the load. Therefore, grid-disconnected power supply and grid-connected power supply without changing the structure and configuration of the original power grid can be achieved by only adding a backup power supply system, and at the same time, it can effectively respond to changes in the power supply demand of the AC load.

The DC/AC converter 12 receives the DC electric energy output from the power supply device, and converts it into AC power to feed the AC grid or AC load. Preferably, the DC/AC converter 12 is a bi-directional DC/AC converter, which can either feed the power output from the power supply device to the power grid, or convert excess power in the power grid to be stored in the energy storage circuit. In some embodiments, the DC/AC converter 12 is a power conditioner (PCS), which performs power conversion and adjusts power quality. The PCS can adopt multiple control strategies. For example, when in connected-grid state, high-power PCS can run in AC current source mode, or adopt virtual synchronous motor control. For example, when in grid-disconnected state, the high-power PCS can run in AC voltage source mode, or adopt virtual synchronous motor control. The energy storage circuit and power conditioner in this disclosure can also be integrated into a complete energy storage system, which has the characteristics of high reliability, high power output and fast response, and can used for load transfer, peak power regulation, and demand regulation in the power grid.

Further, a voltage transformation device is provided between the DC/AC converter and the AC grid. Similarly, a voltage transformation device is provided between the DC/AC converter and the AC load. A protection device such as an AC circuit breaker is also provided on the AC bus 8, which will not be described here.

The controller 112 is configured to control the first energy storage circuitry 1111 to operate in a current source mode and output the required low-frequency power. Specifically, the controller 112 calculates and obtains an output power $P_{ESS}$ of the energy storage circuit and extracts a low-frequency component $P_L$ in the output power. The low-frequency component $P_L$ is used as command value, and the controller 112 adjusts output current of the first energy storage circuitry 1111 according to the $P_L$ to provide the required low-frequency power. The controller 112 is further configured to control the second energy storage circuitry 1112 to operate in a voltage source mode and output the required high-frequency power. Specifically, the controller 112 obtains a voltage reference value $U_{ref}$ of the DC bus 13 as a command value, and adjusts an output voltage $U_{dc}$ of the second energy storage circuitry 1112 according to $U_{ref}$ to stabilize the voltage of the DC bus 13, thereby the second energy storage circuitry 1112 outputting the required high-frequency power.

The first energy storage circuitry 1111 includes a low-power-density energy storage element and a first DC/DC converter, and the controller 112 is configured to control an output current of the first DC/DC converter. The second energy storage circuitry 1112 includes a high-power-density energy storage element and a second DC/DC converter, and the controller 112 is configured to control an output voltage of the second DC/DC converter. Preferably, the first DC/DC converter and the second DC/DC converter are bi-directional DC/DC converters.

Energy storage elements, according to output characteristics thereof, can be divided into two categories: high power density and low power density. The low-power-density energy storage elements have large energy density, but low power density and long response time, and are suitable for low-frequency output. The high-power-density energy storage elements have high power density and short response time, but low energy density, and are suitable for high-frequency output. In order to cope with AC load power fluctuations and stabilize the DC bus voltage, the energy storage circuit needs to frequently absorb or output high power. Frequent high-power charging and discharging will seriously reduce battery lifespan, and it is difficult for a single energy storage device to meet both power and energy requirements. In this case, the present disclosure provides a hybrid energy storage circuit 111 constituted of the first energy storage circuitry 1111 which uses a low-power-density energy storage element, and the second energy storage circuitry 1112 which uses a high-power-density energy storage element. The low-power-density energy storage element and the high-power-density energy storage element cooperate with each other and have complementary advantages, which not only meets a load power scheduling curve, but also improves dynamic performance of the hybrid energy storage circuit 111 and prolongs the service lifespan of each energy storage element.

In the hybrid energy storage circuit of this embodiment, the first energy storage circuitry is operated in the current source mode to provide the low-frequency power, and the second energy storage circuitry is operated in the voltage source mode to stabilize the voltage on the DC bus 13 while providing the power difference. Compared with the scheme in which the first energy storage circuitry and the second energy storage circuitry both operate in the current source mode, the DC bus voltage fluctuation can be suppressed more quickly, the DC bus voltage can be remained to be stable, the dynamic response is good, and the service lifespan of the energy storage element can be prolonged. According to the embodiment, the first energy storage circuitry operates in the current source mode and the second energy storage circuitry operates in the voltage source mode, the first energy storage circuitry provides the required low-frequency power, and the second energy storage circuitry automatically provides the power difference and outputs the required high-frequency power, so the power setting of the first energy storage circuitry and the second energy storage circuitry does not need to be obtained by frequency division, and the tracking performance of high-frequency power is better.

As shown in FIG. 1, the energy storage circuit 111 further has an output port 1113. The output port 1113 is coupled to the DC bus 13. The output terminals of the first energy storage circuitry 1111 and the second energy storage circuitry 1112 are coupled in parallel to the output port 1113. The total output electric energy of the energy storage circuit 111 is transmitted to the DC bus 13 through the output port 1113.

In other embodiments, the energy storage circuit 111 includes a plurality of energy storage circuitries. A part of the plurality of energy storage circuitries include the low-power-density energy storage elements, and the other part of the plurality of energy storage circuitries include the high-power-density energy storage elements. Further, the energy storage circuitries including the low-power-density energy storage elements provide the low-frequency power, which may be the first energy storage circuitries. Similarly, the energy storage circuitries including the high-power-density energy storage elements provide the high-frequency power, which may be the second energy storage circuitries. The controller 112 collects the voltage $U_{dc}$ of the DC bus and the current $I_{dc}$ at the output port 1113 of the hybrid energy storage circuit, and calculates the output power $P_{ESS}$ of the hybrid energy storage circuit, which is the power required for the AC load. In general, distance between the power supply device and the AC load is relatively long, and the controller relies on a communication system to obtain power signals required by the AC load, resulting in poor tracking performance of high-frequency power. According to the disclosure, the controller collects the DC voltage and DC current at the output port 1113, calculates and obtains the output power of the energy storage circuit which is the power required by the AC load in this embodiment, and thus the controller does not need to rely on communication and can directly obtain the power signals of the AC load.

Figure 2:
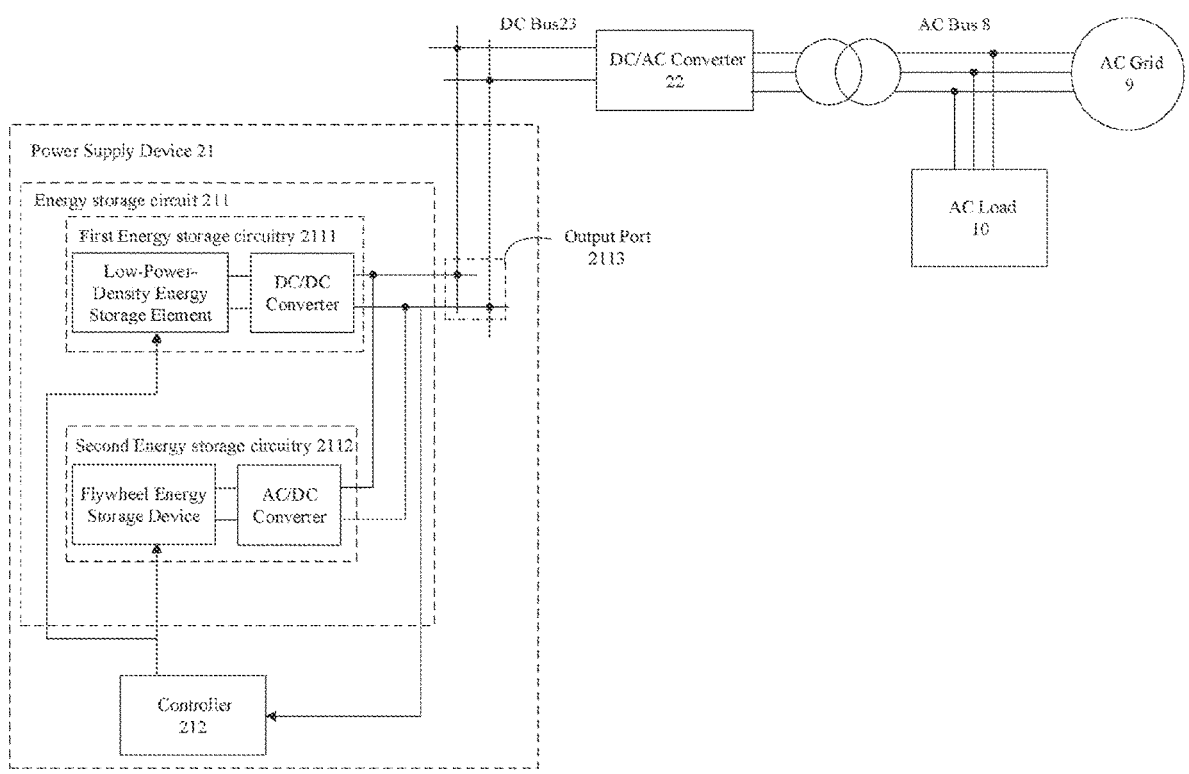
FIG. 2 is a schematic diagram of a power supply system for an AC load according to another exemplary embodiment of the present disclosure.

FIG. 2 is a schematic diagram of a power supply system for an AC load according to another exemplary embodiment of the present disclosure. In this embodiment, a power supply system 2 for an AC load is similar to the power supply system 1 as shown in FIG. 1, and the same reference number represents the same component, structure, and function, and details are not repeated herein. In this embodiment, the power supply system 2 for an AC load includes a power supply device 21 and a DC/AC converter 22. AC side of the DC/AC converter 22 is coupled to the AC grid 9 and the AC load 10 through the AC bus 8. The power supply device 21 is coupled to a DC side of the DC/AC converter through a DC bus 23 and outputs DC electric energy to the DC bus 23. The power supply device 21 includes an energy storage circuit 211 and a controller 212, and the energy storage circuit 211 includes at least a first energy storage circuitry 2111 and a second energy storage circuitry 2112. The first energy storage circuitry 2111 includes the low-power-density energy storage element, and the second energy storage circuitry 2112 includes the high-power-density energy storage element. The difference from the power supply system 1 in the first embodiment is that either the first energy storage circuitry 2111 or the second energy storage circuitry 2112 includes a flywheel energy storage device and an AC/DC converter. The flywheel energy storage device is connected to the AC side of the AC/DC converter, and the DC side of the AC/DC converter is coupled to an output port 2113.

Flywheel energy storage is an emerging energy storage technology. Flywheel energy storage device has characteristics of high energy storage density, high power density, long lifespan, wide operating temperature range, small loss, environmental protection, pollution-free and low maintenance costs, which has great advantages in improving power quality and adapting to load changes. The flywheel energy storage device can be used as both the low-power-density energy storage element and the high-power-density energy storage element. As shown in FIG. 2, the energy storage circuit 211 uses a flywheel energy storage device as the high-power-density energy storage element and uses an accumulator as the low-power-density energy storage element. A hybrid energy storage circuit 211 is constituted of the accumulator and the flywheel energy storage device cooperating with each other. The accumulator provides the low-frequency power, and the flywheel energy storage device provides the high-frequency power while maintaining the DC bus voltage stability.

Figure 3A:
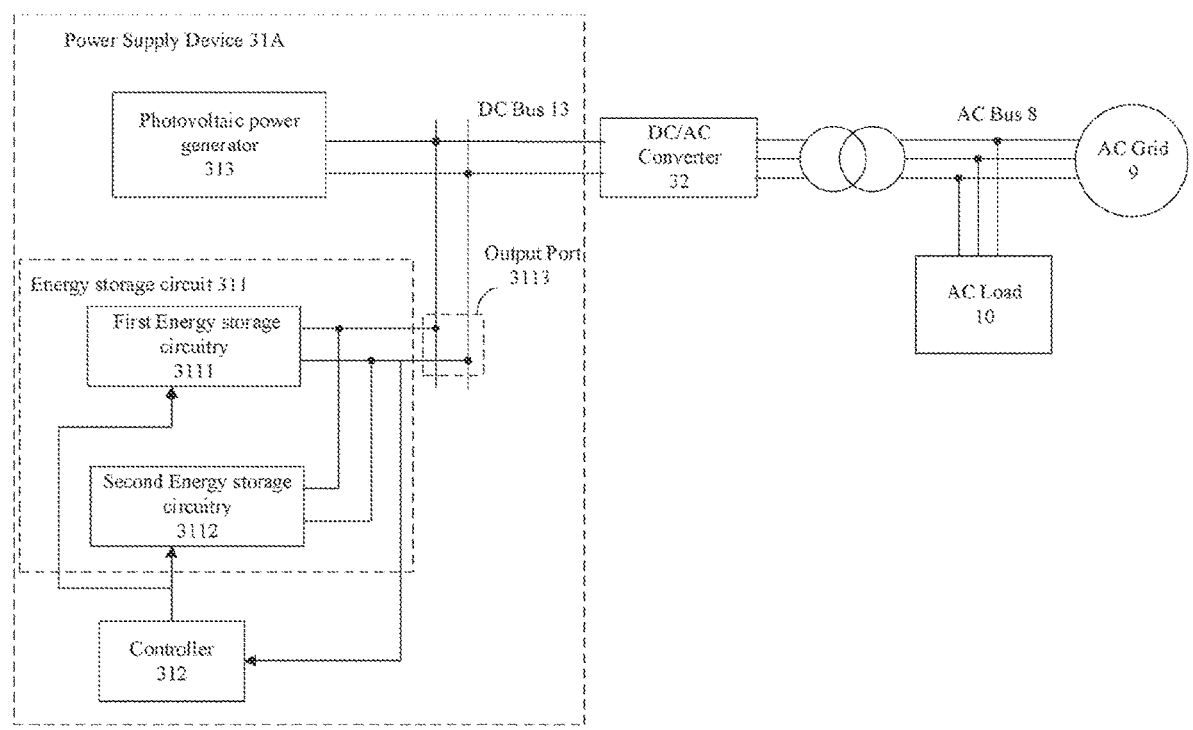
FIG. 3A and FIG. 3B each illustrate a schematic diagram of a power supply system for an AC load according to yet another exemplary embodiment of the present disclosure.
Figure 3B:
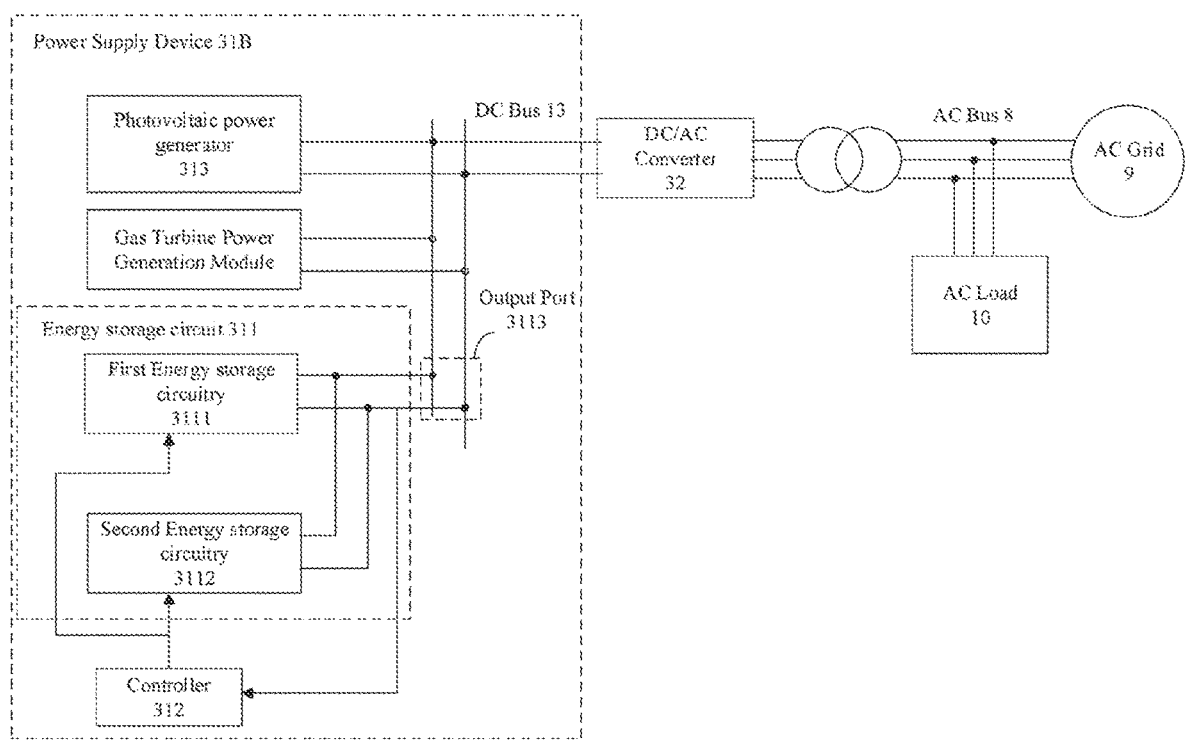

FIG. 3A and FIG. 3B each illustrate a schematic diagram of a power supply system for an AC load according to yet another exemplary embodiment of the present disclosure. As shown in FIG. 3A, a power supply system 3 for an AC load includes a power supply device 31A and a DC/AC converter 32. The power supply device includes an energy storage circuit 311, a controller 312, and a photovoltaic power generator 313. The energy storage circuit 311 includes at least a first energy storage circuitry 3111 and a second energy storage circuitry 3112. In this embodiment, output power $P_{ESS}$ calculated by the controller is the total power of the photovoltaic power generator and the AC load. As shown in FIG. 3B, the power supply device 31B includes a photovoltaic power generator, a gas turbine power generation module, and an energy storage circuit, thereby forming a DC microgrid system. The electric energy from the gas turbine is converted into DC electric energy by the AC/DC converter and transmitted to the DC bus.

In some embodiments, the power supply device is a DC microgrid system, and the power in the DC microgrid system has various forms, such as, but not limited to, photovoltaic power generators, wind power generators, hybrid energy storage circuits, micro gas turbines, or diesel generators. The DC microgrid system and the central PCS form a power supply system for an AC load, which can run in two modes: grid-connected and island. When the AC grid fails, the power supply system for an AC load is quickly disconnected from the AC grid and independently supplies power to the AC load. When the fault of the AC grid disappears and the AC grid returns to normal, the power supply system for an AC load is connected to the AC grid again through grid connection control and operates in the connected grid again. Various microsources in the DC microgrid system may be coordinated and controlled to maintain the power balance of the power supply system and stabilize the DC bus voltage.

Figure 4:
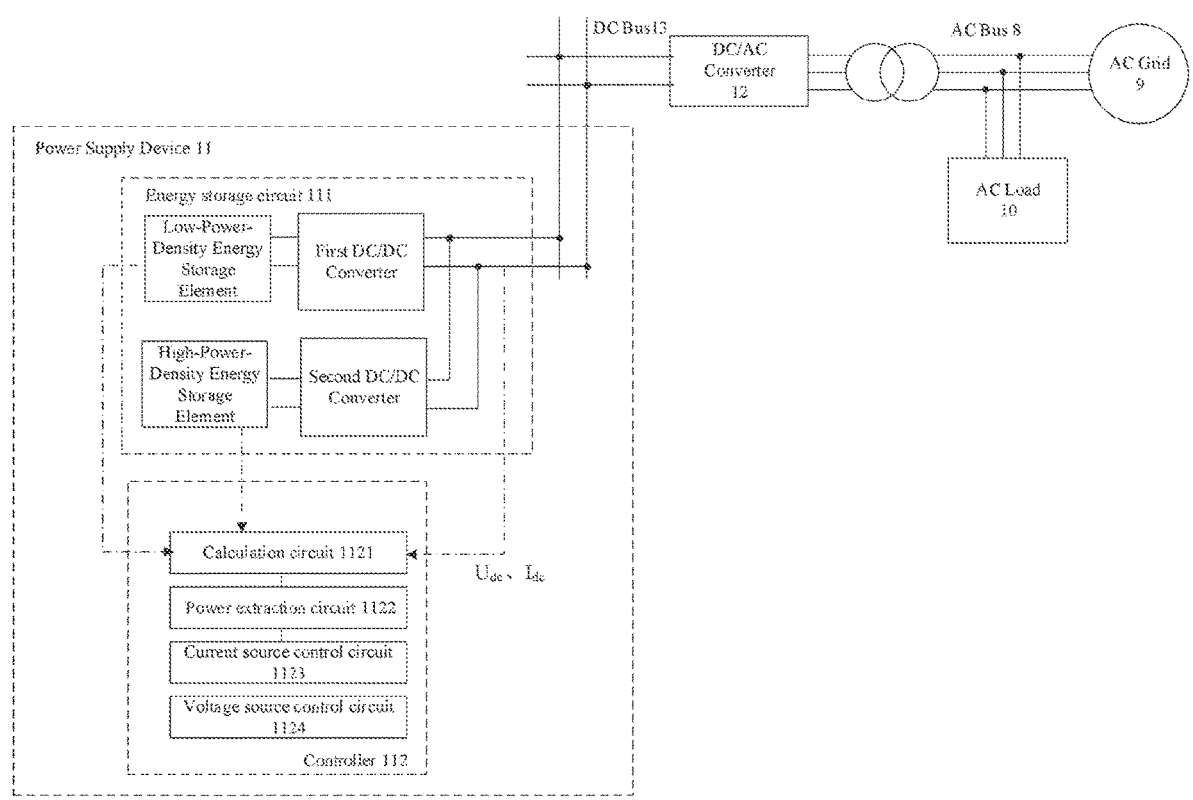
FIG. 4 is a schematic circuit diagram of the power supply system for an AC load in FIG. 1.

FIG. 4 is a schematic circuit diagram of the power supply system for an AC load in FIG. 1. As shown in FIG. 4, the first energy storage circuitry 1111 includes the low-power-density energy storage element and the first DC/DC converter, and the second energy storage circuitry 1112 includes the high-power-density energy storage element and the second DC/DC converter. The controller 112 includes a calculation circuit 1121, a power extraction circuit 1122, a current source control circuit 1123, and a voltage source control circuit 1124.

The calculation circuit 1121 is configured to calculate the output power $P_{ESS}$ of the energy storage circuit 111 according to the voltage signal $U_{dc}$ of the DC bus 13 and the current signal $I_{dc}$ of the output port 1113 of the energy storage circuit. The power extraction circuit 1122 is coupled to the calculation circuit 1121 and configured to extract a low-frequency component $P_L$ in the output power $P_{ESS}$. The current source control circuit 1123 is coupled to the power extraction circuit 1122, and configured to adjust the output power of the first energy storage circuitry according to the low-frequency component $P_L$. The voltage source control circuit 1124 is configured to adjust the output voltage of the second energy storage circuitry according to the voltage reference value of the DC bus 13 to stabilize the voltage $U_{dc}$ of the DC bus 13 while the second energy storage circuitry 1112 automatically outputs the high-frequency power and provides a power deficit.

In this embodiment, when the power supply system for an AC load independently supplies the AC load, the output power of the energy storage circuit 111 is the power required by the load, and the power signal of the AC load 10 can be obtained without relying on communication. In some embodiments, the power supply device 11 further includes a photovoltaic power generator. When the power supply system for an AC load independently supplies power to the AC load, the output power of the energy storage circuit 111 is the total power of the photovoltaic power generator and the AC load 10, and it is not necessary to separately collect the power signal of the photovoltaic power generator and the power signal of the AC load, and the power signal of the AC load can be directly obtained without relying on communication. In other embodiments, the power supply system for an AC load includes multiple power generation modules, and the total power of the power generation modules and the AC load 10 is directly obtained by calculating the output power of the energy storage circuit.

According to an exemplary embodiment of the present disclosure, the first energy storage circuitry 1111 includes a low-power-density battery, the second energy storage circuitry 1112 includes a high-power-density battery, and the calculation circuit 1121 is also used to calculate a state of charge of the high-power-density battery, which is recorded as a first state of charge SOC1, and a state of charge of the low-power-density battery, which is recorded as a second state of charge SOC2.

According to an exemplary embodiment of the present disclosure, the current source control circuit 1123 is configured to receive the low-frequency component $P_L$ output from the power extraction circuit 1122, the charge-discharge current $I_1$ of the low-power density energy storage element, and the voltage $U_{dc}$ of the DC bus, and output switching signals to control switching elements of the first DC/DC converter. The voltage source control circuit 1124 is configured to receive the voltage reference value $U_{ref}$ of the DC bus 13, the DC bus voltage $U_{dc}$, and the charge-discharge current $I_2$ of the high-power density energy storage element, and output switching signals to control switching elements of the second DC/DC converter.

Figure 5:
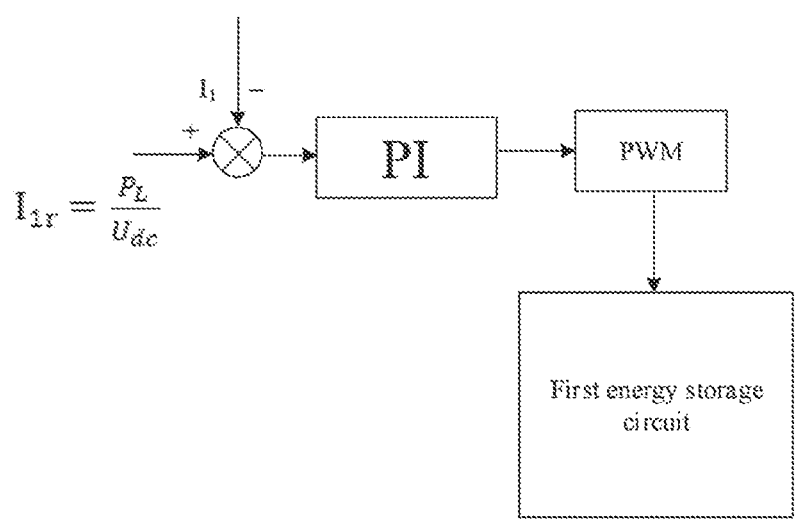
FIG. 5 shows a control block diagram of the current source control circuit 1123 in FIG. 4.

FIG. 5 shows a control block diagram of the current source control circuit 1123 in FIG. 4. As shown in FIG. 5, the charge-discharge current of the low power density energy storage element is controlled by the first DC/DC converter, thereby adjusting the output power of the first energy storage circuitry. Specifically, the current source control circuit 1123 receives the low-frequency component $P_L$ as its power command, and the low-frequency component $P_L$ divides the DC bus voltage $U_{dc}$ to obtain a reference value $I_{1r}$ of the charge-discharge current. The actual charge-discharge current $I_1$ is compared with the reference value $I_{1r}$ to get an error between them, and the error is regulated by the PI regulator, thereby generating the control signal. The control signal is modulated to obtain the switching signals, such as the PWM modulation. And the switching signals are used for driving the switching elements of the first DC/DC converter to realize the charge-discharge control of the low-power-density energy storage element, thereby adjusting the output power of the first energy storage circuitry to provide the required low-frequency power.

Figure 6:
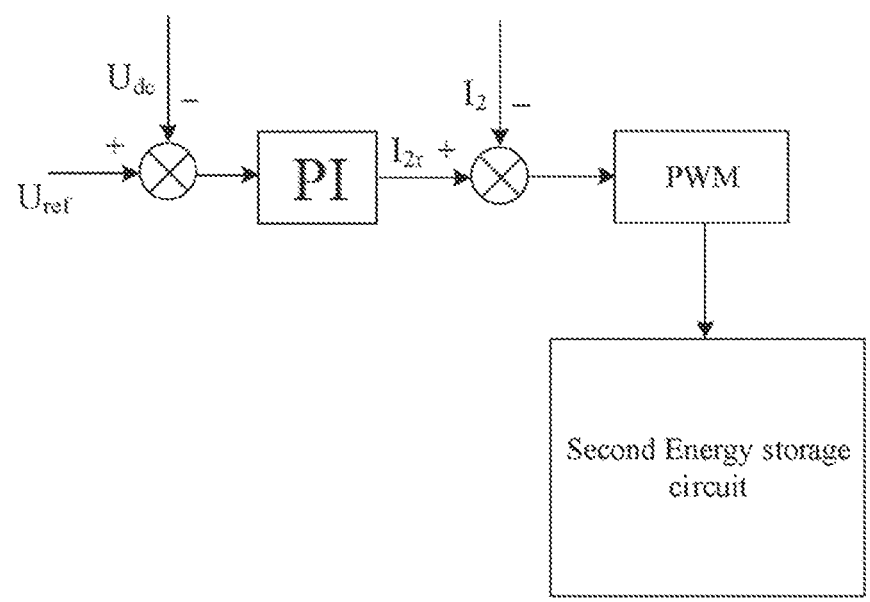
FIG. 6 shows a control block diagram of the voltage source control circuit 1124 in FIG. 4.

FIG. 6 shows a control block diagram of the voltage source control circuit 1124 in FIG. 4. As shown in FIG. 6, the charge-discharge current of the high-power-density energy storage element is controlled by the second DC/DC converter, thereby adjusting the output voltage of the second energy storage circuitry to stabilize the DC bus voltage and automatically provide the high-frequency power. The voltage source control circuit 1124 receives the voltage reference value $U_{ref}$ of the DC bus as a voltage command. The actual bus voltage $U_d$ is compared with the reference value $U_r$ to get an error between them, and the error is regulated by the PI regulator, thereby generating the reference value $I_{2r}$ of the charge-discharge current. The actual charge-discharge current $I_2$ is compared with the reference value $I_{2r}$ to get an error between them, and the error is regulated by another PI regulator, thereby generating the control signal. The control signal is modulated to obtain the switching signals, such as the PWM modulation. And the switching signals are used for driving the switching elements of the second DC/DC converter to realize the charge-discharge control of the high-power-density energy storage element, thereby providing stabilized DC bus voltage and automatically providing power deficit.

Figure 7:
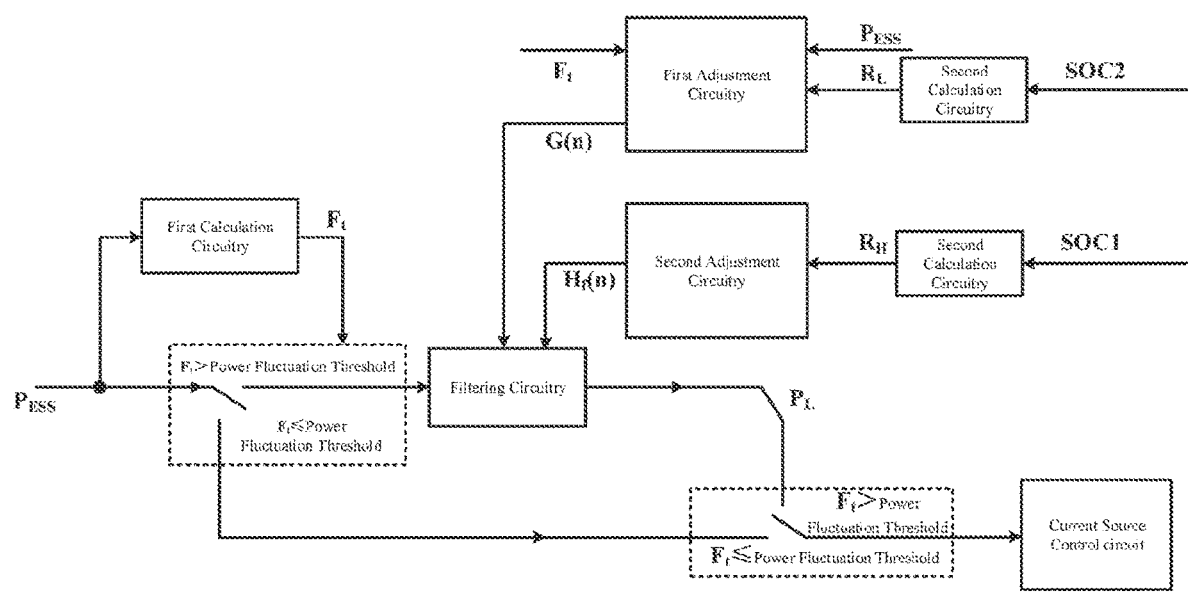
FIG. 7 is a schematic diagram of a power extraction circuit according to an exemplary embodiment of the present disclosure.

FIG. 7 is a schematic diagram of a power extraction circuit according to an exemplary embodiment of the present disclosure. As shown in FIG. 7, the power extraction circuit includes a first calculation circuitry and a filtering circuitry. The first calculation circuitry is configured to receive the output power $P_{ESS}$, and calculate an average power change rate $F_t$ within a period of time t according to the output power $P_{ESS}$. The filtering circuitry is configured to filter the received output power $P_{ESS}$ to obtain the low-frequency component $P_L$ in the output power $P_{ESS}$ when the average power change rate $F_t$ is greater than a power fluctuation threshold, thereby starting the frequency division control mechanism. In this embodiment, the power fluctuation threshold is 1. The equation for calculating the average power change rate $F_t$ is as follows:

$$F_t = \frac{\Delta P_t}{P_n} = \frac{P_{tmax} - P_{tmin}}{P_n} \times 100\% \quad (1)$$

where, $\Delta P_t$ represents the power change in the period of time t, that is, the maximum power value minus the minimum power value within the period of time t, and the value of t is smaller, $P_n$ represents the rated power.

The filtering circuitry filters the output power $P_{ESS}$ through a FIR filtering algorithm to obtain the low-frequency component $P_L$ in the output power $P_{ESS}$.

According to an exemplary embodiment of the present disclosure, the power extraction circuit further includes a second calculation circuitry, a first adjustment circuitry, and a second adjustment circuitry. The second calculation circuitry is configured to calculate and obtain a first charge-discharge balance degree $R_H$ and a second charge-discharge balance degree $R_L$, respectively according to the first state of charge SOC1 and the second state of charge SOC2. The first adjustment circuitry is configured to determine a window function G(n) according to the second charge-discharge balance $R_L$, the output power $P_{ESS}$, and the average power change rate $F_t$ and send the window function G(n) to the filtering circuitry to adjust the window width and window shape of the filtering circuitry according to the window function G(n). The second adjustment circuitry is configured to adjust a preset cut-off frequency $\omega_0$ of the filtering circuitry to obtain a final cut-off frequency $\omega_c$ according to the first charge-discharge balance degree $R_H$, calculate a response function $H_f(n)$ of the final cut-off frequency $\omega_c$ in the time domain, and send the response function $H_f(n)$ to the filtering circuitry. The second calculation circuitry calculates the first charge-discharge balance degree $R_H$ by the following equation:

$$R_H = \frac{SOC1 - \frac{SOC_{max} + SOC_{min}}{2}}{\frac{SOC_{max} - SOC_{min}}{2}} \quad (2)$$

The calculation method of the second charge-discharge balance degree $R_L$ is similar to the first charge-discharge balance degree $R_H$. According to equation (2), the range of the charge-discharge balance degree is: [−1, 1]. The closer the charge-discharge balance degree is to 0, the more moderate the charge-discharge capacity is. The closer the charge-discharge balance degree is to −1, the stronger the charging capacity is and the weaker the discharging capacity is. The closer the charge-discharge balance degree is to 1, the stronger the discharging capacity is and the weaker the charging capacity is. Therefore, an expected value of the charge-discharge balance degree is zero.

The first adjustment circuitry determines whether the low-power-density energy storage element is close to overcharge and over-discharge according to the second charge-discharge balance degree $R_L$. If it is determined that the low-power-density energy storage element is close to overcharge and over-discharge, the window width of the window function G(n) in the filtering circuitry is increased.

Further, the first adjustment circuitry can adjust the window width N(t) of the window function G(n) according to the following equation:

$$N(t) = [2 - R(t-1)^2] \frac{F_t}{F_0} N_0 \quad (3)$$

where, $N_0$ is a preset minimum sample width; $F_0$ is a preset target power fluctuation rate; R(t−1) is a charge-discharge balance degree at time t−1. In the case of weak charging capacity or weak discharging capacity, the output of the hybrid energy storage system will be limited during smooth fluctuations, and the filtering effect needs to be weakened. When the power fluctuation is large, the filtering effect needs to be strengthened.

Further, an adjustment method of weight of the filtering circuitry is as follows:

$$\beta(n) = 1 - k + \frac{kn}{N(n)} \quad (4)$$

where, k is a weighting factor, which is selected according to sample data; a larger k indicates that the more recent output power is valued, and the earlier the output power is, the smaller the influence is.

Further, weight α(n) can be adjusted according to the output power $P_{ESS}$, specifically as shown in the following equation:

$$\alpha(n) = \begin{cases} 1, & |P_{ESS}(n) - P_{ESS}(n-1)| \ll 0.5P_N \\ \dfrac{P_{ESS}(n-1)}{P_{ESS}(n)}, & P_{ESS}(n) - P_{ESS}(n-1) > 0.5P_N \\ \dfrac{P_{ESS}(n)}{P_{ESS}(n-1)}, & P_{ESS}(n) - P_{ESS}(n-1) < 0.5P_N \end{cases} \quad (5)$$

where, $P_N$ is a set value, and the difference between $P_{ESS}(n)$ and $P_{ESS}(n-1)$ in the discrete sequence of output power is large, indicating that the output power has a large sudden change. By reducing the weight $\alpha(n)$, the filtered data is smoother.

The window function G(n) expression is determined by the first adjustment circuitry as follows:

$$G(n) = \frac{\beta(n)\alpha(n)}{\sum_{n=1}^{N-1} \beta(n)} \quad (6)$$

The second adjustment circuitry adjusts the cutoff frequency $\omega_c$ of the filtering circuitry according to the following equation:

$$\omega_c = \begin{cases} \omega_0 + \||R_H| - (1 - D_B)|\omega_H, & |R_H| > (1 - D_B) \\ \omega_0, & (|R_H| \le D_B \wedge [|R_H| \le (1 - D_B)]) \\ \omega_0 - \||R_H| - D_B|\omega_H, & |R_H| \le D_B \end{cases} \quad (7)$$

where, $\omega_0$ is a preset cutoff frequency, $D_B$ is the distance between the current charge-discharge balance degree and $\pm 1$ when the adaptive adjustment of the cut-off frequency needs to be started; $\omega_H$ is a superimposed reference frequency.

When the absolute value of the first charge-discharge balance degree $R_H$ is greater than $1-D_B$, it indicates that the high-power-density energy storage element is close to over-charge or over-discharge, and the cut-off frequency increase calculation needs to be started to weaken the filtering effect and make the output of the high-power energy storage element smaller. When the absolute value of the first charge-discharge balance degree $R_H$ is less than $D_B$, it indicates that the state of charge of the high-power-density energy storage element is moderate, and the cut-off frequency reduction calculation needs to be started to enhance the filtering effect and increase the output of the high-power energy storage element. When the absolute value of the first charge-discharge balance degree $R_H$ is: $D_B < |R_H| \le (1-D_B)$, the preset cut-off frequency $\omega_0$ is maintained.

The second adjustment circuitry obtains the response function $H_f(n)$ according to the following equation:

$$H_f(n) = \frac{1}{2\pi} \int_{-\omega_c}^{\omega_c} H_d(\omega) e^{-j\omega n} d\omega = \frac{\sin\left[\omega_c\left(n - \dfrac{N-1}{2}\right)\right]}{\pi\left(n - \dfrac{N-1}{2}\right)} \quad (8)$$

According to an exemplary embodiment of the present disclosure, the filtering circuitry calculates the filtering function according to the window function G(n), the response function $H_f(n)$, and the output power $P_{ESS}$. The calculation method of the filter function is as follows:

$$P_{Ref} = \sum_{n=1}^{N-1} G(n) P_{ESS}(n) H_f(n) = \frac{\sum_{n=1}^{N-1} \beta(n)\alpha(n) P_{ESS}(n)}{\sum_{n=1}^{N-1} \beta(n)} H_f(n) \quad (9)$$

According to an exemplary embodiment of the present disclosure, when the average power change rate $F_t$ is less than or equal to the power fluctuation threshold, the output power $P_{ESS}$ is the low-frequency component $P_L$. At this time, there is no need to start the frequency division control mechanism, and the output power $P_{ESS}$ is the low-frequency power, which is input to the current source control circuit to control the charging and discharging operation of the low-power density energy storage element.

The filtering method in the above embodiment adopts an open-loop control strategy, and the low-frequency component obtained through the filtering circuitry is input to the current source control circuit. The filtering method of the present disclosure can also adopt a closed-loop control strategy, the low-frequency component $P_L$ is obtained through the filtering circuitry, and a power fluctuation rate of the $P_L$ is calculated. If the power fluctuation rate of the $P_L$ is greater than a set value, the filtering parameters are adjusted according to the power fluctuation rate of the $P_L$, and the $P_L$ is filtered by being input to the adjusted filtering circuitry to obtain a new low-frequency component until the power fluctuation rate of the low-frequency component obtained after filtering is less than the set value.

In related technologies, the filter usually uses a first-order or second-order digital low-pass filter to filter a signal to achieve frequency division process, which has the following disadvantages. For frequency-divided power signals based on communication interaction, it is difficult to balance filtering delay and filtering attenuation ratio, causing the high frequency component and low frequency component to be coupled together, making the frequency division effect very poor and affecting operation of the energy storage circuit. And the failure to reasonably introduce the state of charge of the energy storage element into the frequency division method, results in short operating time of the energy storage circuit and insufficient optimization of the operating mode. The power supply system for an AC load according to the embodiments of the present disclosure is based on a FIR (Finite Impulse Response) filter frequency division method that introduces the state of charge of the energy storage element, which can accurately and timely detect the low-frequency power required by the hybrid energy storage system and control the low-power-density energy storage element to operate. The high-frequency power will be automatically processed by the high-power-density energy storage element. Variables such as the state of charge of the hybrid energy storage system, the magnitude of output power fluctuations, and recent output power are introduced into parameter designing of the filter, and the filter parameters are adaptively adjusted in real time to optimize the configuration, so that the hybrid energy storage circuit can operate as long as possible under the premise of satisfying the control effect, and avoid stopping the power supply system due to overcharge or over-discharge of the battery.

Figure 8:
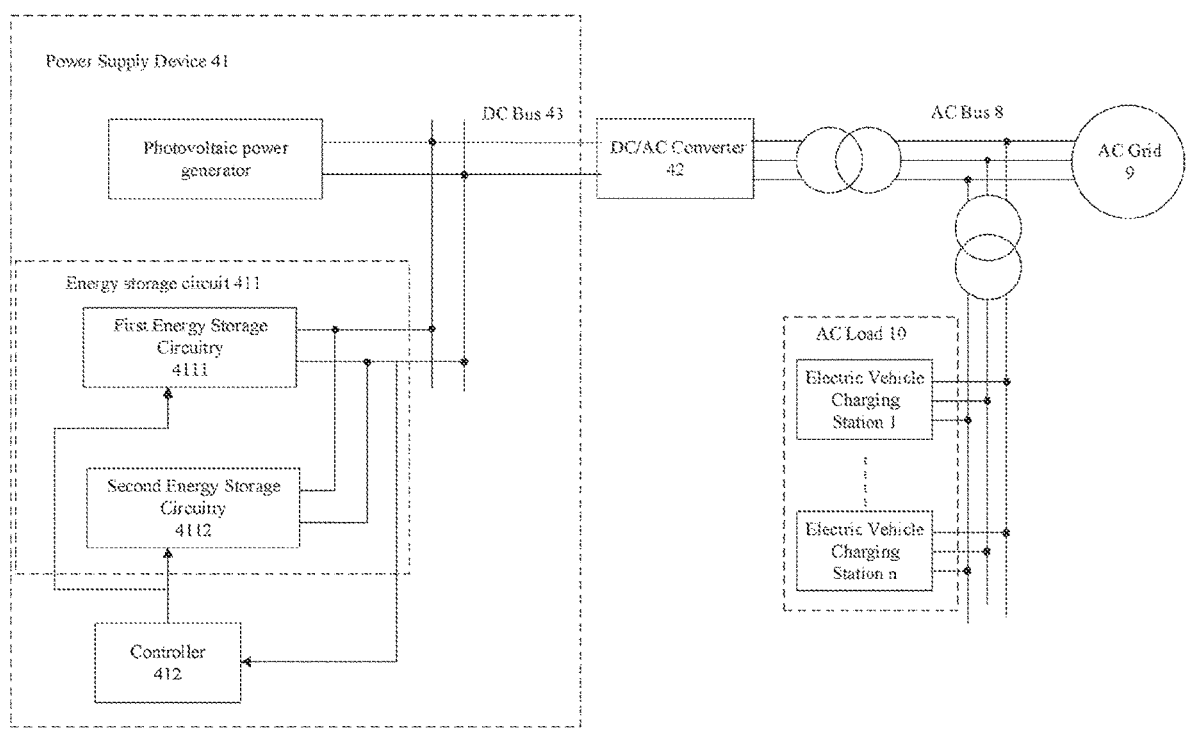
FIG. 8 is a schematic diagram illustrating an AC load as an electric vehicle charging station according to an exemplary embodiment of the present disclosure.

FIG. 8 is a schematic diagram illustrating an AC load as an electric vehicle charging station according to an exemplary embodiment of the present disclosure. In this embodiment, a power supply system for an AC load is similar to the power supply system 1 shown in FIG. 1, and the same reference numbers represent the same components, structures, and functions, which are not repeated here. In this embodiment, the power supply system for an AC load includes a power supply device 41 and a DC/AC converter 42. AC side of the DC/AC converter 42 is coupled to the AC grid 9 and the AC load 10 through the AC bus 8. The power supply device 41 is coupled to the DC side of the DC/AC converter through a DC bus 43 and outputs DC electric energy to the DC bus 43. The power supply device 41 includes a photovoltaic power generator, an energy storage circuit 411, and a controller 412. The energy storage circuit 411 includes at least a first energy storage circuitry 4111 and a second energy storage circuitry 4112. The first energy storage circuitry 4111 includes the low-power-density energy storage element, and the second energy storage circuitry 412 includes the high-power-density energy storage element. In a specific embodiment, any one of the first energy storage circuitry 4111 or the second energy storage circuitry 4112 may further include the flywheel energy storage device and the AC/DC converter. In this embodiment, the AC load 10 includes electric vehicle charging stations 1 to n.

In general, the electric vehicle charging stations include an average daily steady vehicle flow and fluctuating vehicle flow. Therefore, due to the number of charged vehicles, electric energy required by the electric vehicle charging station is divided into long-term steady-state energy and instantaneous dynamic energy. When the power supply system powers the electric vehicle charging station, the power required by the energy storage circuit is the sum of powers of the photovoltaic power generator and the AC load, which includes the low-frequency component and the high-frequency component. The high frequency component is provided by the high-power-density energy storage element, and the high-power-density energy storage element operates in the voltage source mode. The low-frequency component is provided by the low-power-density energy storage element, and the low-power-density energy storage element operates in the current source mode. The AC power supply system is connected to the power grid through the high-power central PCS and AC bus, which can be used as a backup power source to supply electric vehicle charging stations when the AC grid fails, and can also constitute an energy regulation system. For example, when the capacity of the power grid is limited, the AC power supply system can cooperate with the power grid to supply electric vehicle charging stations. The power supply system of the present disclosure realizes the power supply for the charging station in grid-connecting state or grid-disconnected state, without changing the existing charging station structure, and realizes seamless transition between grid-connected state and grid-disconnected state through the DC/AC converter 42.

Figure 9:
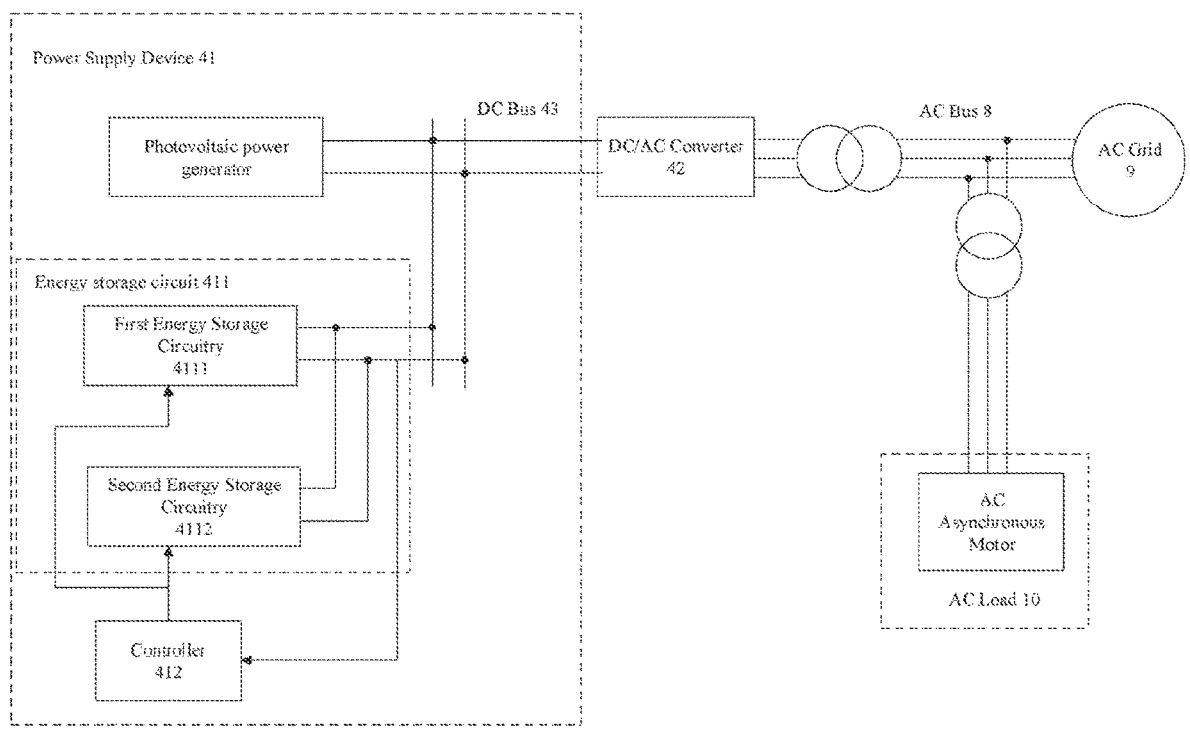
FIG. 9 shows a schematic diagram of an AC load which is an AC asynchronous motor according to an exemplary embodiment of the present disclosure.

According to an exemplary embodiment of the present disclosure, the AC load may also be an AC asynchronous motor. As shown in FIG. 9, the AC load 10 is an AC asynchronous motor. In application scenario of a high-power asynchronous motor, when starting the high-power AC asynchronous motor, it may require a large starting current, usually reaching to 6 to 7 times the rated current. And taking power from the grid will be limited by the capacity of a circuit breaker and the capacity of a transformer, so capacity of the existing distribution grid cannot meet the requirements. The power supply system for an AC load of this embodiment can provide the starting current when the high-power asynchronous motor starts. For example, power for starting the AC asynchronous motor is provided by the high-power-density energy storage element, and power for the AC asynchronous motor being at stable operation is provided by the low-power-density energy storage element.

In some embodiments, the power supply device is a DC microgrid, and the power supply in the DC microgrid has various forms, such as, but not limited to, photovoltaic power generators, wind power generators, hybrid energy storage circuits, micro gas turbines, or diesel generators. The DC microgrid and the central PCS form a power supply system for an AC load, which can operate in an AC current source or a virtual synchronous motor to supply power to the power grid and charging station or supply power to AC asynchronous motors when connected to the power grid. The DC microgrid and the central PCS form the power supply system for an AC load, which can operate in an AC voltage source or the virtual synchronous motor to supply power to the charging station or an AC asynchronous motor when disconnected from the power grid. The power supply system for an AC load is connected to the power grid through a circuit breaker. When the power grid fails or a dispatch command is received to switch to island operation, it is possible to achieve seamless transition by the power supply system such that the AC load can be continuously supplied.

In the power supply system of the present disclosure, the power that the energy storage circuit needs to provide is the sum of the power of the power generation module and the power of the AC load. For example, the power generation module includes the photovoltaic power generator or the wind power generator. The energy storage circuit has a power scheduling curve, and the hybrid energy storage circuit outputs according to this power scheduling curve. In general, the power scheduling curve includes the high-frequency power and the low-frequency power. The low-frequency power corresponds to long-term load demand of low-frequency, and the high-frequency power corresponds to sudden load demand of high-frequency. For example, the high-frequency power corresponds to the power required for starting the AC asynchronous motor, the power demand generated when the AC charging station is connected to a large number of charging vehicles for a short time, or the power required for the fluctuating traffic flow in the electric vehicle charging station. The low-frequency power corresponds to the power for stable operation of the AC asynchronous motor or the long-term steady electrical energy required by the electric vehicle charging station. The long-term steady electrical energy required by the electric vehicle charging station is determined by the average daily steady traffic flow in the electric vehicle charging station. The controller may adjust the output voltage of the high-power-density energy storage element to automatically provide the required high-frequency power. The controller may adjust the output power of the low-power-density energy storage element to provide the required low-frequency power.

The controller includes the power extraction circuit, configured to extract the low-frequency component in the output power $P_{ESS}$. The frequency division method is implemented by using the FIR filter that introduces the state of charge. The frequency division method has the advantages of large filter attenuation ratio and small phase delay near the cut-off frequency. The low-frequency component after filtering can be ideally decoupled from the high-frequency component, and the charge-discharge control is performed in a balanced manner according to the state of charge, which can prolong the operating time of the hybrid energy storage circuit and avoid overcharge or over-discharge of the energy storage elements.

The power supply system for an AC load uses the frequency division control mechanism. The controller controls the low-power-density energy storage element to operate in the current source mode to provide the low frequency power.

The controller controls the high-power-density energy storage element to operate in the voltage source mode, thereby automatically providing the high-frequency power. When the power supply device only includes the energy storage circuit, the output power of the energy storage circuit is equal to the power required for the AC load. When the power supply device includes the energy storage circuit and the power generation module, the output power of the energy storage circuit is equal to the sum of the power of the AC load and the power generation module.

The power supply device and the DC/AC converter constitute the power supply system for an AC load coupling to the AC bus. When the power supply system for an AC load is connected to the grid, the DC/AC converter can operate in the AC current source or the virtual synchronous motor. When the power supply system for an AC load is disconnected with the grid, the DC/AC converter can operate in the AC voltage source or the virtual synchronous motor, and the power supply system supplies AC loads. When the AC load is the charging station, the power supply system of the present disclosure can implement power supply of the charging station in both of grid-connected state and grid-disconnected state without changing the existing charging station structure.

In some embodiments, the output power is determined according to the voltage of the DC bus and the output current of the hybrid energy storage circuit, and power signals of other nodes of the DC microgrid and AC loads can be obtained without relying on communication.

In some embodiments, parameters of the filtering circuitry can be adaptively adjusted based on the state of charge of the high-power-density energy storage element, the state of charge of the low-power-density energy storage element, and the output power of the hybrid energy storage circuit, and the low-frequency component that the hybrid energy storage circuit needs to output can be detected in a timely and accurate manner, ensuring that the hybrid energy storage circuit can operate as long as possible on the premise of the control effect being satisfied, and avoiding the system to stop running due to overcharge or over-discharge of the batteries.

Figure 10:
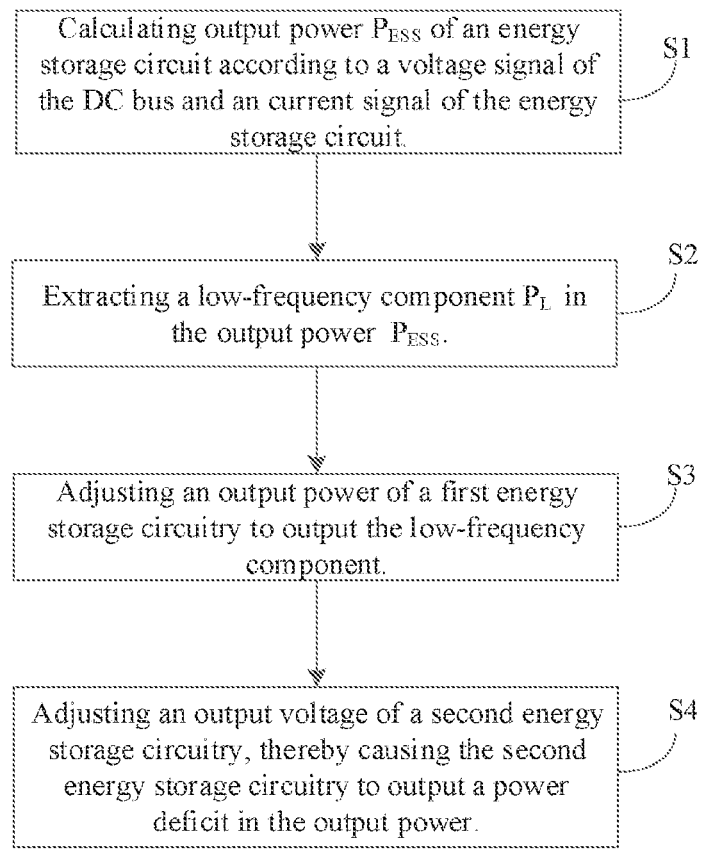
FIG. 10 shows a flowchart of a power supply method according to an exemplary embodiment of the present disclosure.

FIG. 10 shows a flowchart of a power supply method according to an exemplary embodiment of the present disclosure. As shown in FIG. 10, the power supply method is used in the power supply system for the AC load shown in FIG. 1 or FIG. 4 or FIG. 8 or FIG. 9. The power supply method includes at least steps 1 to 4.

At step 1, an output power $P_{ESS}$ of an energy storage circuit is calculated according to a voltage signal of the DC bus and an current signal of the energy storage circuit.

At step 2, a low-frequency component $P_L$ in the output power $P_{ESS}$ is extracted.

At step 3, an output power of a first energy storage circuitry is adjusted to output the low-frequency component.

At step 4, an output voltage of a second energy storage circuitry is adjusted, thereby causing the second energy storage circuitry to output a power deficit in the output power.

The low-frequency component $P_L$ in the output power $P_{ESS}$ is obtained through the FIR filter, corresponding to the low-frequency output that the energy storage circuit needs to provide. The power deficit refers to remaining power component after filtering out the low-frequency component from the output power, which is corresponding to the high-frequency output that the energy storage circuit needs to provide.

According to an exemplary embodiment of the present disclosure, the first energy storage circuitry includes a low-power-density battery, the second energy storage circuitry includes a high-power-density battery. The power supply method further includes: calculating a first state of charge SOC1 which is a state of charge of the high-power-density battery, and calculating a second state of charge SOC2 which is a state of charge of the low-power-density battery.

Figure 11:
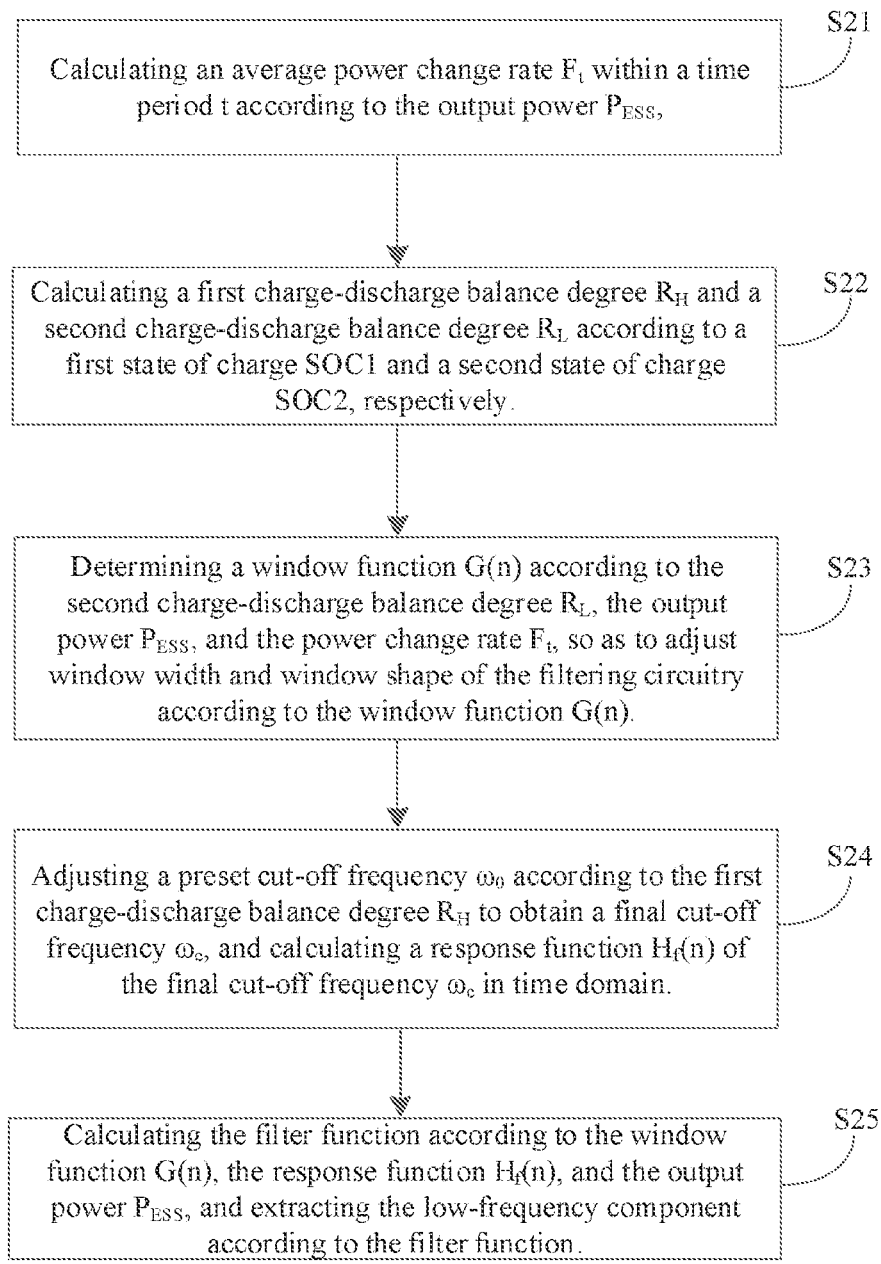
FIG. 11 shows a flowchart of step 2 in FIG. 10 according to an exemplary embodiment.

FIG. 11 shows a flowchart of the step 2 in FIG. 10 according to an exemplary embodiment. As shown in FIG. 11, the above step 2 further includes steps 21 to 25.

At step 21, an average power change rate $F_t$ within a period of time t is calculated according to the output power $P_{ESS}$. The average power change rate $F_t$ can be calculated according to equation (1). When the average power change rate $F_t$ is greater than the power fluctuation threshold, the output power $P_{ESS}$ is filtered to obtain the low-frequency component $P_L$ in the output power $P_{ESS}$ which is output to the first energy storage circuitry as a power command of the first energy storage circuitry. When the average power change rate $F_t$ is less than or equal to the power fluctuation threshold, the output power $P_{ESS}$ only includes low-frequency power fluctuations, which can be directly output to the first energy storage circuitry as the power command of the first energy storage circuitry without filtering the output power $P_{ESS}$.

At step 22, a first charge-discharge balance degree $R_H$ and a second charge-discharge balance degree $R_L$ are calculated according to the first state of charge SOC1 and the second state of charge SOC2, respectively. The charge-discharge balance degree can be calculated according to equation (2).

At step 23, a window function G(n) is determined according to the second charge-discharge balance degree $R_L$, the output power $P_{ESS}$, and the power change rate $F_t$, so as to adjust the window width and window shape of the filtering circuitry according to the window function G(n). The window width can be adjusted according to equation (3), and the weight can be adjusted according to equation (4) and equation (5) to adjust the window shape. The expression of the window function can be calculated according to equation (6).

At step 24: a preset cut-off frequency $\omega_0$ is adjusted according to the first charge-discharge balance degree $R_H$ to obtain a final cut-off frequency $\omega_c$, and a response function $H_f(n)$ of the final cut-off frequency $\omega_c$ in the time domain is calculated. The cut-off frequency $\omega_c$ can be calculated according to the equation (7), and the response function $H_f(n)$ can be calculated according to the equation (8).

At step 25, a filter function is calculated according to the window function G(n), the response function $H_f(n)$, and the output power $P_{ESS}$, and the low-frequency component is extracted according to the filter function. The filtering function can be calculated according to equation (9).

Those skilled in the art may understand that all or parts of the steps for implementing the above embodiments are implemented as a computer program executed by a central processing unit (CPU). When the computer program is executed by a central processing unit (CPU), the functions defined in the system provided by the present disclosure are performed. The program may be stored in a computer-readable storage medium, and the storage medium may be a read-only memory, a magnetic disk, or an optical disk.

In addition, it should be noted that the drawings are merely schematic illustrations of processes included in the system according to exemplary embodiments of the present disclosure, and are not limited thereto. It is easy to understand that the processes shown in the above drawings do not intend to indicate or limit the chronological order of these processes. In addition, it is also easy to understand that these processes may be performed synchronously or asynchronously in multiple modules.

Those skilled in the art may understand that the above modules may be distributed in the method according to the description of the embodiment, or may be distributed in one or more methods that are different from the embodiments. The modules in the above embodiments may be combined into one module, or further divided into multiple sub-modules.

Through the description of the above embodiments, those skilled in the art can easily understand that the exemplary embodiments described herein can be implemented by software, or by software in combination with necessary hardware. Therefore, the technical solution according to the embodiments of the present disclosure may be embodied in the form of a software product, which may be stored in a non-volatile storage medium (e.g., a CD-ROM, a U-disk, a mobile hard disk, etc.) or on a network, including several instructions to enable a computing device (which may be a personal computer, a server, a mobile terminal, or a network device, etc.) to execute a system according to an embodiment of the present disclosure.

The exemplary embodiments of the present disclosure have been particularly shown and described above. It should be understood that the present disclosure is not limited to the detailed structure, arrangement or implementation system described herein; rather, the present disclosure is intended to cover various modifications and equivalent arrangements included within the spirit and scope of the appended claims.

What is claimed is:

1. A power supply system for an alternating current (AC) load, comprising:
   a DC/AC converter an AC side of that is coupled to an AC grid and the AC load through an AC bus; and
   a power supply device coupled to a DC side of the DC/AC converter through a DC bus and configured to output DC electric energy to the DC bus;
   wherein the power supply device comprises:
   an energy storage circuit comprising a first energy storage circuitry and a second energy storage circuitry, and
   a controller configured to control a conversion operation of the first energy storage circuitry to output a low-frequency power, and a conversion operation of the second energy storage circuitry to output a high-frequency power.

2. The power supply system according to claim 1, wherein, the controller is configured to control the first energy storage circuitry to operate in a current source mode to output the low-frequency power, and the second energy storage circuitry to operate in a voltage source mode to output the high-frequency power.

3. The power supply system according to claim 1, wherein, the first energy storage circuitry comprises a low-power-density energy storage element and a first DC/DC converter; and the controller is configured to control an output current of the first DC/DC converter.

4. The power supply system according to claim 1, wherein, the second energy storage circuitry comprises a high-power-density energy storage element and a second DC/DC converter; and the controller is configured to control an output voltage of the second DC/DC converter.

5. The power supply system according to claim 1, wherein, the first energy storage circuitry or the second energy storage circuitry comprises a flywheel energy storage device and an AC/DC converter, and the controller is configured to control an output current or an output voltage of the AC/DC converter.

6. The power supply system according to claim 1, wherein, the energy storage circuit has an output port coupled to the DC bus, an output terminal of the first energy storage circuitry and an output terminal of the second energy storage circuitry are coupled in parallel to the output port, and total output electric energy of the energy storage circuit is transmitted to the DC bus through the output port.

7. The power supply system according to claim 1, wherein, the power supply device is a DC microgrid system, comprising one or more of a photovoltaic power generator, a wind power generator, and a diesel generator.

8. The power supply system according to claim 1, wherein, the controller comprises:
   a calculation circuit, configured to calculate an output power of the energy storage circuit according to a voltage signal of the DC bus and a current signal of the energy storage circuit;
   a power extraction circuit, coupled to the calculation circuit and configured to extract a low-frequency component in the output power;
   a current source control circuit, coupled to the power extraction circuit and configured to adjust an output power of the first energy storage circuitry according to the low-frequency component;
   a voltage source control circuit, configured to adjust an output voltage of the second energy storage circuitry according to a voltage reference value of the DC bus, causing the second energy storage circuitry to output the high-frequency power.

9. The power supply system according to claim 8, wherein, the first energy storage circuitry comprises a low-power-density battery, the second energy storage circuitry comprises a high-power-density battery, and the calculation circuit is further configured to calculate a first state of charge which is a state of charge of the high-power-density battery and a second state of charge which is a state of charge of the low-power-density battery.

10. The power supply system according to claim 9, wherein, the power extraction circuit comprises:
    a first calculation circuitry, configured to calculate an average power change rate within a period of time according to the output power;
    a filtering circuitry, configured to filter the output power to obtain the low-frequency component in the output power when the average power change rate is greater than a power fluctuation threshold.

11. The power supply system according to claim 10, wherein, the power extraction circuit further comprises:
    a second calculation circuitry, configured to calculate and obtain a first charge-discharge balance degree and a second charge-discharge balance degree respectively according to the first state of charge and the second state of charge;
    a first adjustment circuitry, configured to determine a window function according to the second charge-discharge balance degree, the output power, and the average power change rate, and send the window function to the filtering circuitry to adjust window width and window shape of the filtering circuitry according to the window function;
    a second adjustment circuitry, configured to adjust a cutoff frequency of the filtering circuitry according to the first charge-discharge balance degree, calculate a response function of the cutoff frequency in a time domain, and send the response function to the filtering circuitry.

12. The power supply system according to claim 11, wherein, the filtering circuitry is further configured to calculate a filtering function according to the window function, the response function, and the output power, and extract the low-frequency component according to the filtering function.

13. The power supply system according to claim 10, wherein, when the average power change rate is less than or equal to the power fluctuation threshold, the output power is the low-frequency power and output to the current source control circuit.

14. The power supply system according to claim 1, wherein, the AC load is an AC asynchronous motor, the second energy storage circuitry is configured to provide power for starting the AC asynchronous motor, and the first energy storage circuitry is configured to provide power for stable operation of the AC asynchronous motor.

15. The power supply system according to claim 1, wherein, the AC load is an electric vehicle charging station.

16. A power supply method, applied to a power supply system for an AC load, wherein, the power supply system for the AC load comprises a DC/AC converter an AC side of that is coupled to an AC grid and the AC load through an AC bus, and a power supply device coupled to a DC side of the DC/AC converter through a DC bus and configured to output DC electric energy; the power supply device comprises a controller, and an energy storage circuit comprising a first energy storage circuitry and a second energy storage circuitry; and wherein the method comprises:
  calculating an output power of the energy storage circuit according to a voltage signal of the DC bus and a current signal of the energy storage circuit;
  extracting a low-frequency component in the output power;
  adjusting an output power of the first energy storage circuitry according to the low-frequency component; and
  adjusting an output voltage of the second energy storage circuitry, causing the second energy storage circuitry to output a high-frequency power.

17. The method according to claim 16, wherein, the first energy storage circuitry comprises a low-power-density battery, the second energy storage circuitry comprises a high-power-density battery, and the method further comprises:
  calculating a first state of charge which is a state of charge of the high-power-density battery and a second state of charge which is a state of charge of the low-power-density battery.

18. The method according to claim 17, wherein, the extracting the low-frequency component in the output power comprises:
  calculating an average power change rate within a period of time according to the output power;
  filtering the output power to obtain the low-frequency component in the output power when the average power change rate is greater than a power fluctuation threshold; and
  outputting the low-frequency component to a current source control circuit.

19. The method according to claim 18, wherein, when the average power change rate is less than or equal to the power fluctuation threshold, outputting the output power that is the low-frequency component to the current source control circuit.

20. The method according to claim 18, wherein, the extracting the low-frequency component in the output power further comprises:
  calculating a first charge-discharge balance degree and a second charge-discharge balance degree respectively according to the first state of charge and the second state of charge;
  determining a window function according to the second charge-discharge balance degree, the output power, and the power change rate;
  adjusting window width and window shape of the filtering circuitry according to the window function;
  adjusting a preset cutoff frequency to obtain a final cutoff frequency according to the first charge-discharge balance degree;
  calculating a response function of the final cutoff frequency in a time domain; and
  calculating a filter function according to the window function, the response function, and the output power.

* * * * *